United States Patent [19]

Holmes et al.

[11] Patent Number: 4,806,729
[45] Date of Patent: Feb. 21, 1989

[54] LASER WAX JOINERY METHOD AND APPARATUS

[75] Inventors: J. Fred Holmes; John M. Hunt; Douglas C. Draper, all of Portland, Oreg.; Todd L. Cloninger, Dallas, N.C.; Tom R. Mersereau, Gladstone; Michael J. Hosler, Molalla, both of Oreg.

[73] Assignee: Oregon Graduate Center, Beaverton, Oreg.

[21] Appl. No.: 141,408

[22] Filed: Jan. 4, 1988

[51] Int. Cl.$^4$ .............................................. B23K 26/00
[52] U.S. Cl. ............................ 219/121.63; 219/121.64
[58] Field of Search ....................... 219/121.63, 121.64, 219/121.61, 121.73, 121.78, 121.82

[56] References Cited

U.S. PATENT DOCUMENTS

| | | | |
|---|---|---|---|
| 3,472,721 | 10/1969 | Abramson et al. | 156/366 |
| 3,769,117 | 10/1973 | Bowen et al. | 156/69 |
| 3,981,230 | 9/1976 | Lee | 219/121.35 X |
| 3,989,778 | 11/1976 | Osborne | 219/121.35 X |
| 4,219,720 | 8/1980 | Moench | 219/121.35 |
| 4,224,096 | 9/1980 | Osborne | 156/380 |
| 4,413,180 | 11/1983 | Libby | 250/236 |
| 4,473,424 | 9/1984 | Sorko-Ram | 156/268 |

Primary Examiner—C. L. Albritton
Attorney, Agent, or Firm—Kolisch, Hartwell & Dickinson

[57] ABSTRACT

A laser wax joinery method and apparatus are disclosed. Molded wax segments, such as those used to produce patterns for investment casting, are immobilized relative to one another, with their conforming marginal edges in abutted relationship, on a two axis rotatable tilt table. A laser beam of controllable energy density scans the edges of the wax segments, forming therealong a wax weld pool that, while molten, is maintained generally horizontal by rotation of the tilt table. The laser beam's energy density is modulated to correspond with the varying thickness of the edges to be joined. A laser beam delivery system includes a process robot and a lens and mirror system for directing the beam generally vertically toward the surface of the wax segments. Shrinkage by wax dripping or filler vaporization is avoided by precisely controlling the energy density adjacent the weld joint. By coordinating the operation of the tilt tables and the laser beam delivery system, under the programmable control of a master controller, it is possible repeatably to produce strong, smooth, uninterrupted weld joints. In modifications, the wax weld pool is controlled by preparatory covering of the surface adjacent the abutted edges with a fluid-resistant, conformable, and laser beam-transmissive polyethylene, or thermally conductive metal foil, material that, while transmitting, or conducting, a substantial portion of the laser energy to the wax segments, prevents loss of wax by dripping. In another modification, the weld pool is controlled by multiply scanning the abutted edges at a reduced energy density.

19 Claims, 3 Drawing Sheets

LASER WAX JOINERY METHOD AND APPARATUS

BACKGROUND AND SUMMARY OF THE INVENTION

This invention relates generally to laser wax joinery, and more particularly to method and apparatus for automatic plural wax segment joinery in the production of patterns for investment casting.

In the manufacture of large castings, unitary wax models of the desired part are used to produce molds for use, in turn, in what is called a lost wax casting method. Such wax models are expensive to manufacture and usable only once.

One alternative to unitary wax model preparation, in the case of a large, circularly symmetric casting, is the segmentation of the wax model into preferably identical circumferential components that may be pieced together into a complete wax pattern. The joining of wax pattern segments for such large castings conventionally requires substantial manual labor and expense Such manual methods usually include preparation of each wax segment so as to conform the to-be-joined edges, and the use of hand tools, e.g. hot irons to weld abutting marginal edges of the wax segments and scrapers to restore the original surface characteristics and smoothness thereof.

Controlling the weld pool, that semi-liquid pool of wax within the range of the heat gun, in order to form a strong but smooth seam between the wax segments is problematic, especially with manual methods and tools. Achieving sufficient heat penetration for wax bonding, while avoiding loss of wax through dripping and vaporization, requires precise weld pool control. Attaining that measure of control, repeatably and cost effectively, requires, at least, semi-automation.

The feasibility of laser wax joinery has been determined experimentally, providing the basis for the method and apparatus of the present invention. Much has been learned about how precisely to control the wax weld pool by controlling laser beam power, beam diameter and welding rate, and by positioning or covering the weld pool to minimize wax shrinkage and dripping. As a result of this experimentation, and by the teachings of the present disclosure, it is possible accurately, repeatably and cost effectively to join wax segments under programmed control. It will be understood that wax segments, a used herein, refers to any two or more pieces of wax that may be joined, including the headers and risers that are needed to facilitate the injection molding process, as well as segment pairs that, when joined, represent the outline of the part to be cast.

Accordingly, it is an object of the present invention to provide method and apparatus for automatically joining wax pattern segments by the use of a laser.

Another object of the invention is to provide apparatus capable of forming smooth, finished seams requiring a minimum of manual rework.

A further object is to provide a method for controlling the wax weld pool produced by the laser welding of wax segments.

Yet another object of the invention is to provide a control system for automatically, repeatably joining plural wax segment pairs.

The preferred embodiment of the present invention includes a variable power, $CO_2$ laser whose beam is directed robotically, under programmed control, along abutted marginal edges of the wax segment pairs to-be-joined. The segments of each pair are immobilized relative to one another in a fixture mounted on a tilt table Plural tilt tables are positioned circumferentially about a process robot's laser-equipped arm. According to the preferred method of the invention, the wax weld pool precisely is controlled via control of the laser beam's energy density (power, diameter and scan rate), while maintaining, substantially horizontal, that portion of the abutted wax segment pair to which the laser beam is directed.

In a modification to the preferred method, the weld pool is controlled by the preparatory covering of the seam to be welded with a flow-resistant, conformable, but substantially laser beam-transmissive polyethylene material. In a modification to the covering step, a flow-resistant, conformable, thermally conductive, metal foil material is used, the material preferably being painted black on one side to reduce reflection of laser energy and having an adhesive preparation on the other. In another modification to the preferred method, the weld pool is controlled by the application of air pressure to restore the molten wax to its original position. In yet another modification, the laser beam's energy density is reduced, and the beam repeatedly is scanned across a portion of the seam to be welded, thus avoiding wax dripping or filler vaporization. In still another modification, the wax segments' to-be-joined edges are prepared to be joggle-lap, rather than planar abuttment, joined further to increase the strength of the resulting weld joint.

By the method and apparatus of the present invention, strong, smooth, weld joints repeatably may be made in the joining of plural wax segments, and wax patterns for investment casting may be produced in a fully automated process that significantly reduces costs.

These and other advantages and features of the invention will become more fully apparent when the detailed description below is read with reference to the accompanying drawings.

DETAILED DESCRIPTION OF THE PREFERRED EMBODIMENT

Figure 1:
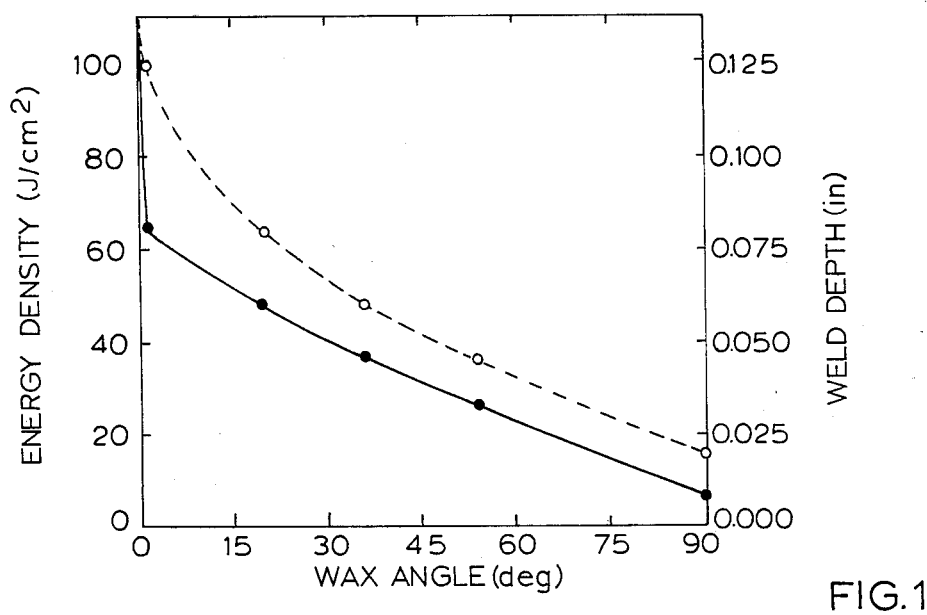
FIG. 1 is a graph of experimental data relating maximum energy density and weld depth to wax incline from the horizontal.

FIG. 1 shows the experimental results of varying the angle of the surface to be welded, from horizontal to vertical, relative to a generally vertical laser beam. The dashed line in FIG. 1 describes the maximum energy density for drip-free laser wax joinery; the solid line describes the maximum weld depth for drip-free laser wax joinery It may be seen that the wax must be within approximately 20° of horizontal to prevent significant wax flow, or dripping, at the energy density needed to weld 0.09 inch thick segments Even at angles of incline from the horizontal as little as 1.5°, it has been discovered that noticeable dripping occurs. Therefore, it is preferable to maintain the region of the wax segments being welded as nearly horizontal as possible for so long as the weld pool is appreciably fluid.

Figure 2:
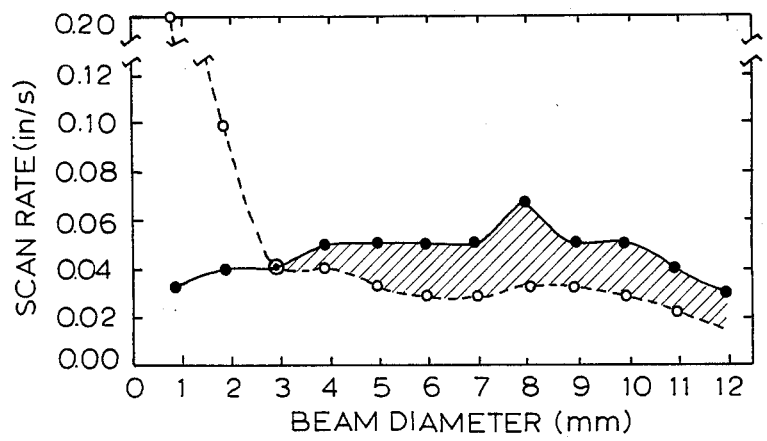
FIG. 2 is a graph of experimental data relating scan rate to beam diameter.

FIG. 2 shows the experimental results of measuring the relationship between scan rate and beam diameter, as each impacts wax bonding and shrinkage. The solid line in FIG. 2 shows the maximum scan rate that results in complete wax melting of a 0.09 inch segment; the dashed line shows the minimum scan rate required to avoid shrinkage, which typically results from filler vaporization at high temperatures. It may be seen from the graph in FIG. 2 that, at a laser power of 3.2 W, there are a range of scan rates and beam diameters (represented by a shaded area between the two curves) which avoid the problem of shrinkage and yet achieve complete melting, thereby producing weld joints that are strong yet smooth.

Figure 3:
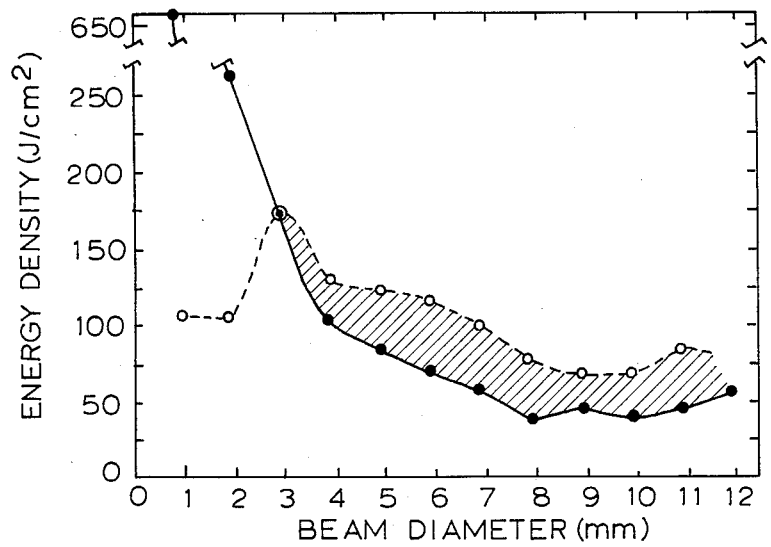
FIG. 3 is a graph of experimental data relating energy density to beam diameter.

FIG. 3 shows experimental results of measuring the relationship between energy density and beam diameter using a 3.2 W laser. The solid line shows the minimum energy density required to ensure complete melting of a 0.09 inch wax segment; the dashed line shows the maximum energy density permitted if shrinkage is to be avoided. Thus, FIG. 3 illustrates a range of beam diameters and energy densities (represented by a shaded area between the two curves) that meet these two important criteria.

Figure 4:
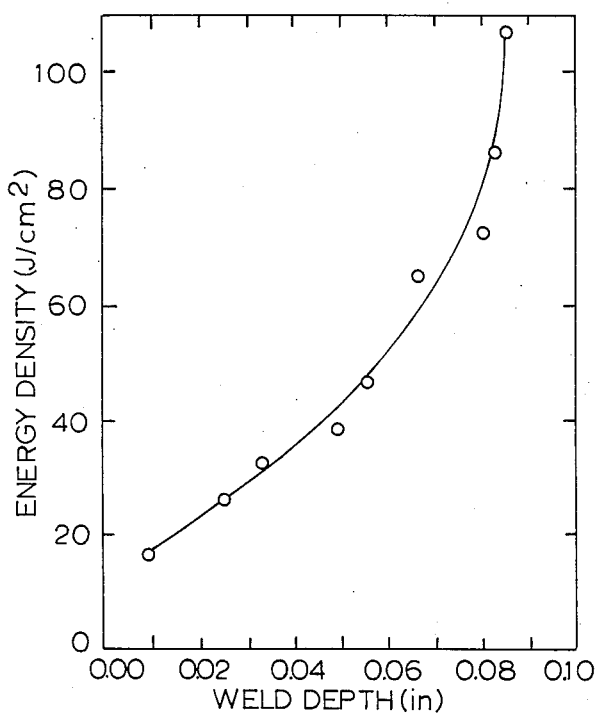
FIG. 4 is a graph of experimental data relating laser beam energy density to resultant weld depth.

FIG. 4 shows the important experimental results of measuring the weld depth that results from a variation in laser energy density when a 0.229 cm (0.090 inch) wax sheet is scanned by a laser beam of 7 mm diameter. It may be seen from the graph that, as the depth of the weld approaches the thickness of the wax, the energy density required effectively to fuse abutted wax edges increases exponentially It is clear from these data that a further increase in the energy density of the laser beam would result in negligible, further, effective welding penetration. For this reason, it is necessary to weld wax segments together by laser scanning first one and then the other side of the abutted edges. As energy density is a function of beam diameter, beam power and the speed at which the beam is scanned, these parameters productively may be traded off to avoid undesirable results, including wax dripping; filler vaporization and blistering; and the formation of surface imperfections in the finished weld joint It will be appreciated that, in the case of a wax segment pair having to-be-joined edges of varying thicknesses, the energy density may be varied to effect desired weld strength and quality. For example, it is possible to reduce the energy density by repeatedly welding over the same surface before the molten wax completely has cooled. This method is recommended especially for thicker sections of the to-be-joined edges, as it allows the surfaces of the wax segments to cool while their interiors still are being heated As will be described in reference to FIG. 5 and Table 1, this reduced energy density, plural scan method results in improved surface quality, while producing an equally strong weld joint.

Figure 5:
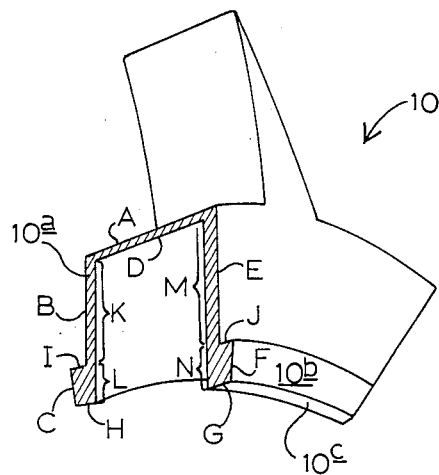
FIG. 5 is a perspective view of a wax segment that may be joined, as illustrated by example, using the preferred method and apparatus of the present invention.

Turning next to FIG. 5, a wax segment 10 of widely variant thicknesses is described. The welding of segment 10 to a similar, mating segment (not shown) along an edge 10, shown in crosshatch pattern, will be described by reference to Table 1, which contains reference designators corresponding to edge sections A through N of segment 10 in FIG. 5.

It may be seen from Table 1 that the laser welding along edges, such as edges G, H, I, J, does not involve scanning at all. Instead, the beam is programmed to remain stationary relative to wax segments 10, thereby effectively spot welding these joints It also may be seen that, depending upon the length and thickness of the various edge sections, a number of parameters are controlled effectively to produce good wax bonding and smoothness, including: number of scans, laser power and welding rate Other variables, such as wax distance and beam diameter vary in accordance with the location of segments 10 relative to carrier 14 and table 16 (refer to FIG. 6), with the beam diameter being greater at greater distances of segments 10 from laser means 20. It will be appreciated that, because an unfocused laser beam increases in diameter as it propagates, the diameter of the beam at segments 10 may be varied by adjusting the distance between the laser and the segments to be welded. Depending upon the minimum beam diameter of the laser, which in the preferred embodiment is 1.6 mm, lenses may be used to focus the beam and to produce a smaller beam diameter when needed.

Importantly illustrated in Table 1 is a preferred method by which relatively thick edge sections may be joined without compromising the smoothness of the finished seam. This method involves the plural scanning of a particular region of the wax pair's substantially conforming edges at a relatively reduced energy density, rather than the single scanning at an energy density sufficiently high to produce filler vaporization and/or blistering. For example, in the laser welding of segment 10, edge sections C, F, L, N are scanned a number of times to produce adequate weld depth and satisfactory weld smoothness. As might be expected, it has been discovered that the energy density required for (each of) four passes, for example, is approximately equal to one fourth of that required for a single pass, but that multiple passes produce better surface quality. Finally, it is important to note that, to obtain a uniform welding depth, it has been determined that a variable welding rate may be used, wherein the rate continuously is reduced along the length of the weld. This compensates for the fact that energy and heat storage in the wax causes the earlier part of a weld to accumulate more heat than the latter part of the weld.

Figure 6:
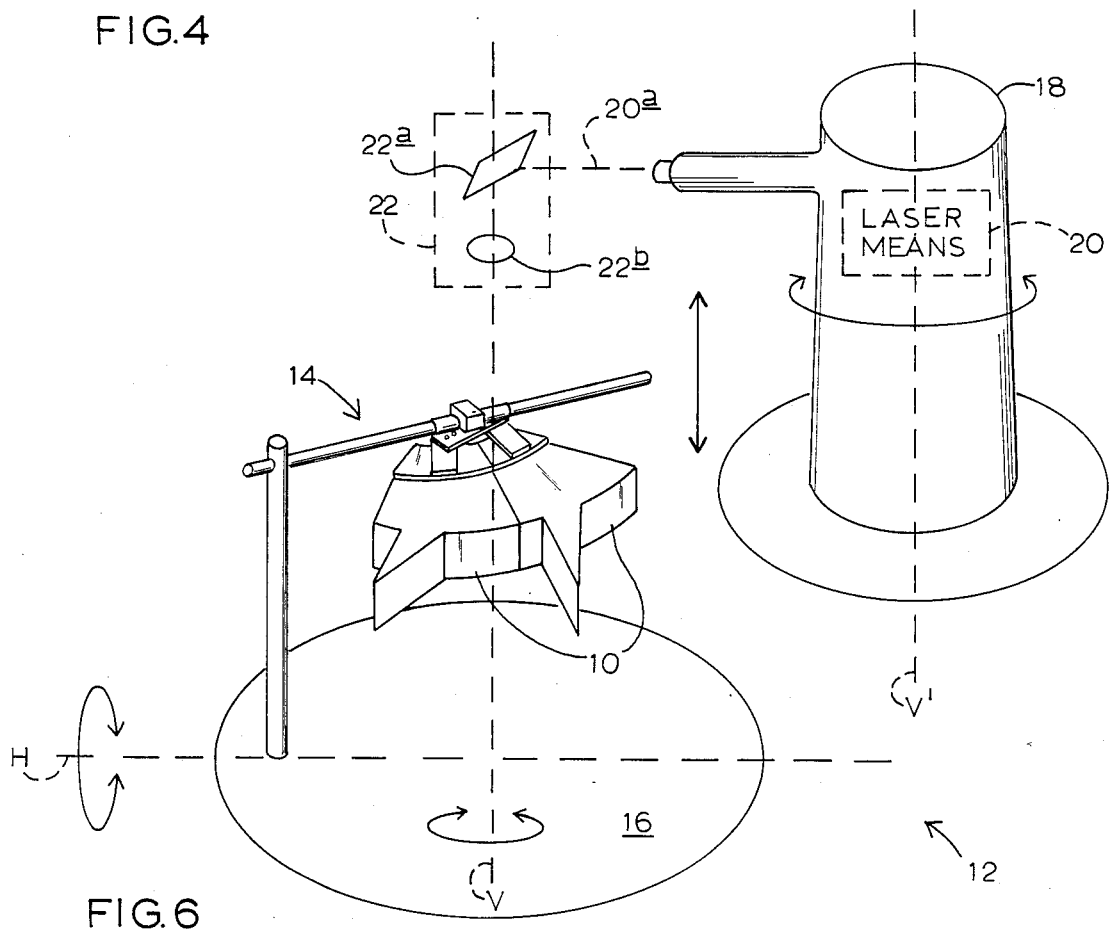
FIG. 6 is an isometric view that illustrates the laser joinder of a pair of wax segments by the use of the preferred embodiment of the invention.

Turning now to FIG. 6, the preferred embodiment of the invention is illustrated Single-position laser welding apparatus is indicated generally at 12 Apparatus 12 includes means 14 for immobilizing, in abutted relationship with one another, the substantially conforming marginal edges of a pair of wax segments 10. Immobilizing means, or carrier, 14 is shown securing together, by well-known means, wax segments 10 in fixed relationship to rotating means, or rotary tilt table 16. The preferred embodiment of the invention provides for rotating carrier 14 about a generally horizontal axis H and about a generally vertical axis V by first and second rotation means, respectively, e.g. table 16 and conventional motors (not shown).

A robot 18 is shown as being capable of rotating about a vertical axis V' to enable it controllably to serve more than one table, such as table 16, as will be described in reference to FIG. 7. Robot 18 is operatively connected to laser means, or a laser system, 20 having operatively connected therewith a laser controller (not shown) capable of producing a laser beam 20a of controllable power and predetermined diameter Beam delivery means 22, which includes a deflecting mirror 22a and, optionally, a lens 22b, selectively and controllably is capable of controlling beam 20a by expanding it (via a beam expander, not shown) or focusing it (via lens 22b), and of directing the thus-controlled beam from laser means 20 onto the to-be-joined edge sections of segments 10 By the rotation of immobilizing means 14 about vertical and horizontal axes, the marginal edges of segment pair 10 may be oriented relative to beam 20a, which in the preferred embodiment is generally vertical, to allow contiguous, or uninterrupted welding along the extent of the marginal edges to produce a pattern of joined wax segments.

If it is desired to weld larger segments than those illustrated in FIG. 6, means further may be provided for translating table 16 along vertical axis V, or translating robot 18 along vertical axis V' (or both), to adjust the relative heights of the to-be-joined wax segments and beam delivery means 22, as indicated by an arrow. It will be appreciated that, by the orthogonal arrangement of the two rotational axes H, V, virtually any position of to-be-joined segments 10 relative to laser beam 20a may be attained, rendering the proposed apparatus highly flexible. Means (not shown) for controlling table 16, robot 18, laser means 20 and beam delivery means 22, in a manner to be described and illustrated fully in reference to FIG. 7, renders possible the automatic laser welding of wax segment pairs 10.

Figure 7:
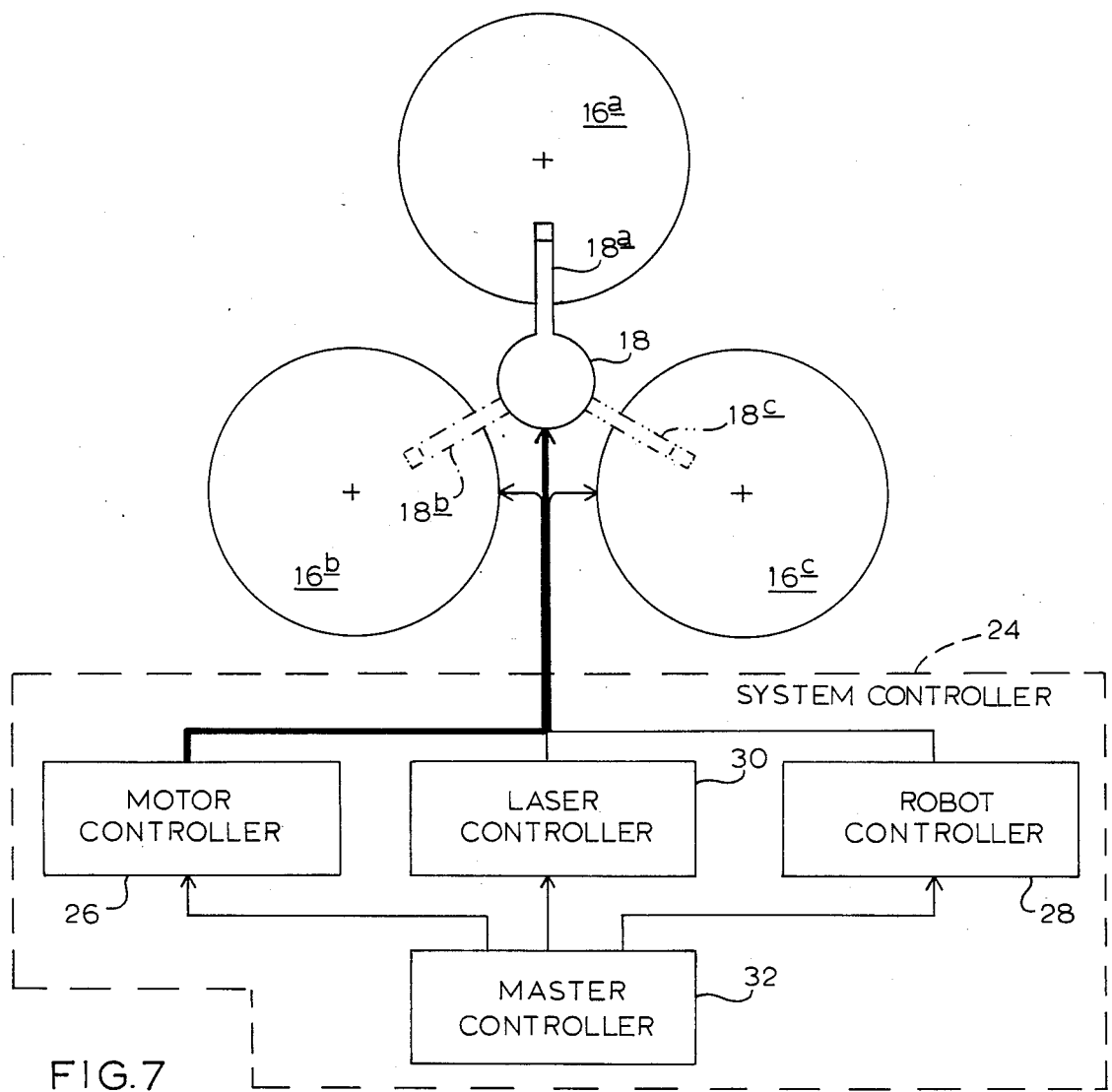
FIG. 7 shows a top, plan view of the layout of a fully automatic laser wax joinery system, including a block diagram of the system's control elements.

Turning now to FIG. 7, a schematic, block diagram of a proposed system layout is illustrated in which three evenly, arcuately spaced, rotary tilt tables 16a, 16b, 16c are served by robot 18 via a system controller indicated generally at 24. Shown in phantom lines at 18b, 18c are the outlines of a manipulable arm 18a of robot 18 when positioned to serve tables 16b, 16c, respectively It will be appreciated that, by this arrangement of tables 16 circumferentially about a 270°-360° rotatable robot 18, the laser welding of wax segments may be performed in parallel fashion For example, while certain welded sections of the wax segments immobilized relative to table 16a are cooling, laser-equipped robot 18 can weld wax segments that have been immobilized relative to table 16b or 16c. By immobilizing preferably identical wax segment pairs within carriers (not shown) on tables 16a, 16b, 16c, it is possible straightforwardly to develop an optimized control algorithm that incrementally advances to process completion the welding of plural wax segment pairs.

In the preferred embodiment, system controller 24 includes a plural rotary/tilt table motor controller 26; a robot controller 28, which is operatively connected to robot 18; and a laser controller 30, which is operatively connected to a laser (not shown), for controlling the power of a laser beam. The operations of each of the controllers included in system controller 24 are coordinated by a programmable master controller, or computer 32, thereby to achieve maximum accuracy and throughput of the multi-station wax joinery system. It will be understood that laser means (not shown) corresponding to laser means 20 in FIG. 6 and beam delivery means (not shown) corresponding to beam delivery means 22 in FIG. 6 may be integral with robot 18, as implied by the proposed system layout illustrated in FIG. 7.

It will be appreciated by those skilled in the art that master controller 32, and, to a lesser extent, controllers 26, 28, 30, may be programmed to provide fully automatic operation Conventional numerical control methods would permit the system illustrated in FIG. 7 to 'learn' from a manual operator the process steps and sequences required optimally to laser join wax segment pairs. Application software that executes in master controller 32 subsequently can execute automatically those process steps that relate to the joining of a single wax segment pair, and time-interleave the learned process steps, as among rotary tilt tables 16a, 16b, 16c, and as among controllers 26, 28, 30, repeatably and consistently to join like pairs of wax segments Obviously, within the spirit of the invention, alternative numbers and arrangements of tables 16 and robot 18 may be devised, while still providing fully automatic, multi-station laser wax joinery.

Figure 8:
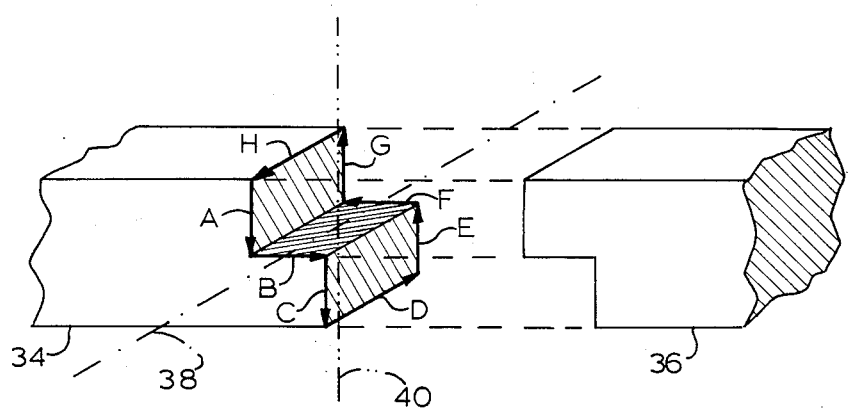
FIG. 8 is an isometric view of to-be-joined wax segments illustrating a laser beam scanning pattern, and further showing a modification to the preferred embodiment in which a joggle-lap butt joint, rather than a plain butt joint, may be laser welded.

Referring finally to FIG. 8, the laser joinder of wax segments 34, 36 will be described in detail It first will be noted that the to-be-joined edges of segments 34, 36 are, in a proposed modification to the preferred embodiment, joggle-lap butt, rather than plain butt, joined It will be appreciated that, within the spirit of the invention, any of a variety of well known joints may be used, e.g. miter or mortise and tenon. It also will be appreciated that edge surfaces may be preformed to produce a somewhat convex pre-weld joint, thereby to compensate for the tendency of the heated wax to shrink when welded.

Wax segments 34, 36, which are shown in FIG. 8 in laterally spaced apart relation for the purpose of clarity, are prepared to have conforming, joggle-lap butted edges that, when laser welded, provide greater strength than might plain butted edges. Shown as directed line segments A, B, C, D, E, F, G, H are edged sections which may be joined by scanning a laser beam in the direction of the arrows, beginning with any desired segment. Obviously, other scanning patterns may be used, within the spirit of the invention, to produce the desired strong, uninterrupted, smooth weld joints.

It will be appreciated that, for optimum weld depth, segments A, B, C, E, F, G would be welded by directing a laser beam at the joined edges generally normal to the corresponding surfaces, or generally parallel with axis 38. Similarly, edges D, H preferably would be joined by directing a laser beam generally normal to their corresponding surfaces, or generally parallel with axis 40. It also will be appreciated that directing the laser beam at the various edges, but not normal to the corresponding surfaces, would result in lesser weld penetration given the same laser power, beam diameter and weld rate. It also will be appreciated that the plural scan, reduced energy density, method described herein may be used in welding segments B, F, thereby producing an equally strong weld joint, with less risk of wax shrinkage or dripping.

The preferred method of the present invention now may be understood By abutting the marginal edges of a pair of wax segments to create a line-of-joinder therebetween and immobilizing the segments relative to one another, e.g. by the use of carrier 14; producing relative motion between the line-of-joinder and a laser beam, or irradiating the abutted edges with a laser beam of predetermined selectable energy density, while moving the beam along the abutted edges at a predetermined selectable velocity, to form a wax weld pool e.g. by the use of laser means 20 and rotary tilt table 16; and cooling the pool to form an uninterrupted weld joint along the marginal edges, the pair of wax segments may be joined to produce a wax pattern.

Moving the laser beam relative to the line-of-joinder between the abutted marginal edges, whereby the region of beam/line-of-joinder impingement follows the line-of-joinder in such manner that the region is maintained generally horizontal, provides needed control of the wax weld pool. By thus controlling the irradiation of the abutted edges of the wax segment pair and the movement of the beam relative thereto, e.g. by the use of controllers 26, 28, 30, 32, appreciable flow of the weld pool may be prevented, thereby producing strong, finished weld joints. Alternatively, controlling of the weld pool may be accomplished by covering the regions adjacent the abutted edges during the irradiation with a conformable, flow-resistant, substantially laser beam-transmissive material, e.g. polyethylene. In the preferred method of the invention, maintaining the weld pool horizontal is accomplished by positioning the abutted edges generally horizontally; directing the laser beam at the abutted edges; and rotating and translating carrier 14 relative to the laser at a predetermined selectable velocity so that the wax weld pool formed by the irradiation thereof remains generally horizontal throughout the irradiation process, e.g. by the programmable control of table 16 and laser means 20

In a proposed modification to the preferred method of the invention, the wax weld pool is controlled by repeatedly moving, or scanning a laser beam of reduced energy density along the abutted edges, thereby producing a strong weld joint, while avoiding wax dripping or filler vaporization In another modification, the covering step of the alternative method uses a flow-resistant, conformable, thermally conductive, metal foil, e.g. 3 mil aluminum foil, which is adhered to the abutted edges with an adhesive capable of withstanding high temperatures, e.g. black PVC tape. Even though the exposed surface of the metal is painted to minimize reflection, there are substantial energy losses in the metal foil material (as great as 50%), and these losses must be compensated for by, for example, commensurate increases in the energy densities listed in Table I. Finally, still another modification to the preferred method of controlling the wax weld pool involves applying air pressure to the pool to redirect molten wax back into its original position. It has been found that even when critical parameters such as air nozzle dimensions, alignment and air pressure are properly adjusted, a somewhat wavy wax surface results. Nevertheless, the smoothness of the resulting weld joint may be somewhat improved by reflowing the surface using a second, fast laser scan.

The advantages offered by the invention should be apparent to those skilled in the art. By the combination of a laser having controllably variable power and beam diameter; means for controllably directing the laser beam at the abutted edges of to-be-joined wax segments that have been immobilized relative to one another by a carrier; and a rotary tilt table mounting the carrier and providing rotation thereto about horizontal and vertical axes, the repeatably accurate and finished welding of wax segment pairs is made possible. By the use of a conventional robot, plural rotary tilt tables arcuately spaced apart thereabout may be served by conventional numerical control methods Finally, by the use of a programmable master controller to 'learn', store and selectively repeat the process steps required to position the robot, direct the laser beam and rotate-translate the tilt tables, cost effective, fully automatic laser wax segment joinery is made possible, thereby significantly facilitating the repeatable and consistent production of patterns for use in investment casting.

Accordingly, while a preferred embodiment of the invention and a preferred method of the invention have been described herein, it is appreciated that further modifications are possible that come within the scope of the invention.

It is claimed and desired to secure by Letters Patent:

1. In the field of plural-wax-segment pattern manufacture of mold beds for investment casting, a wax joinery apparatus comprising:
   means for immobilizing, in abutted relationship with one another, substantially conforming marginal edges of a pair of wax segments, and
   laser means for welding such edges to produce a pattern of joined wax segments.

2. The apparatus of claim 1, further comprising means for rotating said immobilizing means about a horizontal axis.

3. The apparatus of claim 1, further comprising means for rotating said immobilizing means about a vertical axis.

4. The apparatus of claim 1, further comprising means for translating said laser means vertically relative to said immobilizing means.

5. The apparatus of claim 1, wherein said laser means comprises a laser capable of producing a beam of controllable power and predetermined diameter, a laser controller operatively connected to said laser for controlling such beam power, and beam delivery means selectively and controllably capable of controlling such beam diameter and directing such controlled beam from said laser to such edges.

6. The apparatus of claim 5, which further includes first rotation means for rotating said immobilizing means about a generally horizontal axis and second rotation means for rotating said immobilizing means about a generally vertical axis, whereby such marginal edges of such pair of segments can be oriented relative to said beam in a manner allowing uninterrupted welding along the extent of such marginal edges.

7. The apparatus of claim 6 which further includes means for controlling said laser controller, said beam delivery means, and said first and second rotation means, said controlling means enabling said apparatus to operate automatically.

8. The apparatus of claim 7, wherein said controlling means is capable of learning process steps and sequences from an operator, thereby to enable subsequent, automatic repetition of such learned process steps and sequences.

9. The apparatus of claim 8 which further includes means for translating said laser means generally vertically relative to said immobilizing means, wherein said controlling means is capable further of controlling said translating means.

10. In the field of plural-wax-segment pattern manufacture of mold beds for investment casting, a wax joinery apparatus comprising:

plural, rotary tilt tables disposed in a circular arc about a laser system, each of said tables having the capacity to hold immobile, relative to one another, each of a pair of wax segments having substantially conforming marginal edges, each of said tables being capable of rotating, responsive to dual motors and a motor controller, about a generally vertical axis and about a generally horizontal axis;

a laser system comprising a laser capable of producing a beam of controllable power and diameter, and a laser controller;

a robot operatively connected with said laser system and being capable of controllably serving said tilt tables and having at least one manipulable arm capable of directing said beam from said laser system to each such segment pair, said robot further having associated therewith a robot controller; and a master controller capable of coordinating the operations of said motor controller, said laser controller and said robot controller, said master controller being programmably capable of learning process steps and sequences from an operator and subsequently automatically repeating such learned process steps and sequences.

11. A method for joining generally conforming marginal edges of a pair of wax segments utilizing laser beam irradiation comprising:

abutting such edges of such a segment pair;

immobilizing the segments in the pair relative to one another;

irradiating such abutted edges with a laser beam of predetermined variable energy density to form a wax weld pool by moving such beam relatively along such abutted edges at a predetermined selectable velocity; and cooling such pool to form an uninterrupted weld joint along such edges.

12. The method of claim 11, further comprising controlling said irradiating and said moving to prevent appreciable flow of such weld pool.

13. The method of claim 12, wherein said controlling is performed by maintaining, generally horizontal, such pool while the same is appreciably fluid.

14. The method of claim 12, wherein said controlling is performed by covering, during said irradiating, the regions adjacent such abutted edges with a conformable, flow-resistant, substantially laser beam-transmissive material.

15. The method of claim 12, wherein said controlling is performed by covering, during said irradiating, the regions adjacent such abutted edges with a conformable, flow-resistant, substantially thermally conductive material.

16. The method of claim 12, wherein said controlling includes repeating said moving a plurality of times, each at a reduced laser beam energy density.

17. In the field of laser beam, plural-wax-segment pattern manufacture of mold beds for investment casting that utilizes a pair of wax segments having generally conforming marginal edges, a wax joinery method comprising:

abutting such edges of such a pair of segments to create a line-of-joinder therebetween;

immobilizing such segments relative to one another; and producing relative motion between such laser beam and such line-of-joinder, whereby the region of impingement of such beam on such line-of-joinder follows such line-of-joinder in such manner that such region is maintained generally horizontal.

18. In the field of plural-wax-segment pattern manufacture of mold beds for investment casting that utilizes a pair of wax segments having generally conforming marginal edges, a carrier for holding such pair, a rotating-translation table supporting such carrier and capable of moving such carrier relative to a laser, and a laser capable of producing a beam of controllable energy density, a wax joinery method comprising:

abutting such edges of such a pair of segments;

immobilizing such segments relative to one another on such carrier;

positioning such rotation-translation table so that a length of such abutted edges is generally horizontal;

while directing such laser of-controllable energy density at such abutted edges within such length, rotating-translating such carrier relative to such laser at a predetermined selectable velocity so that such beam irradiates such abutted edges to form a wax weld pool that, while appreciably fluid, is maintained generally horizontal; and cooling such pool to form an uninterrupted weld joint of desired depth along the extent of such abutted edges.

19. The method of claim 18, wherein said directing-rotating-translating is performed by controlling such laser and such rotation-translation table programmably, whereby like pairs of segments repeatably and consistently can be joined.

* * * * *